United States Patent Office 3,186,661
Patented June 1, 1965

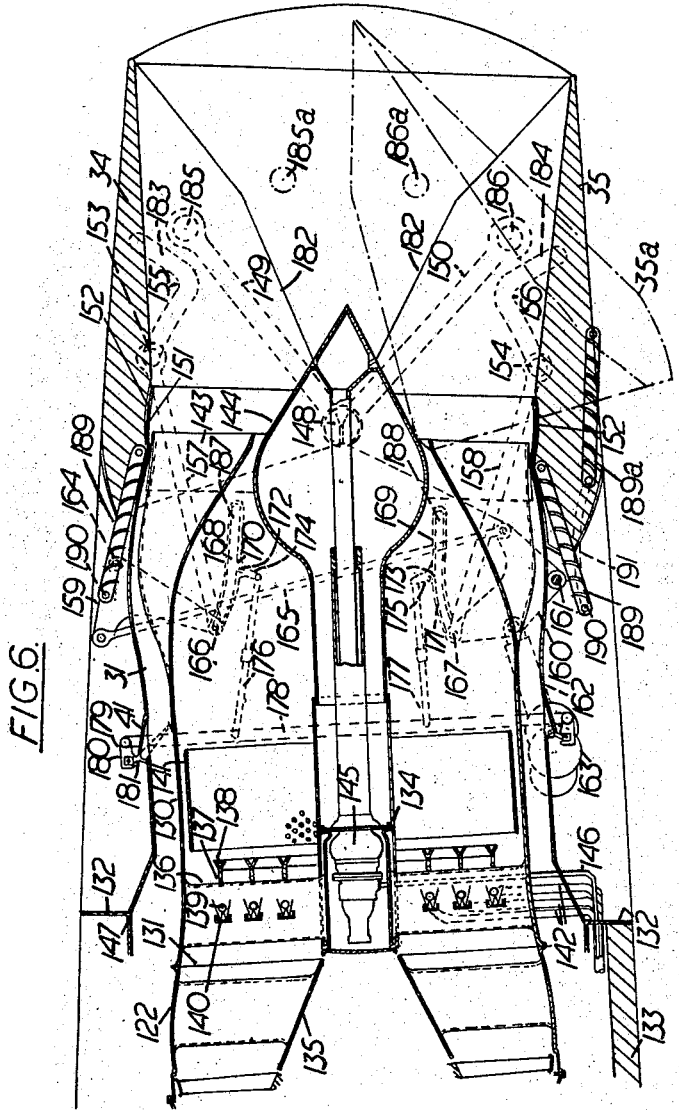

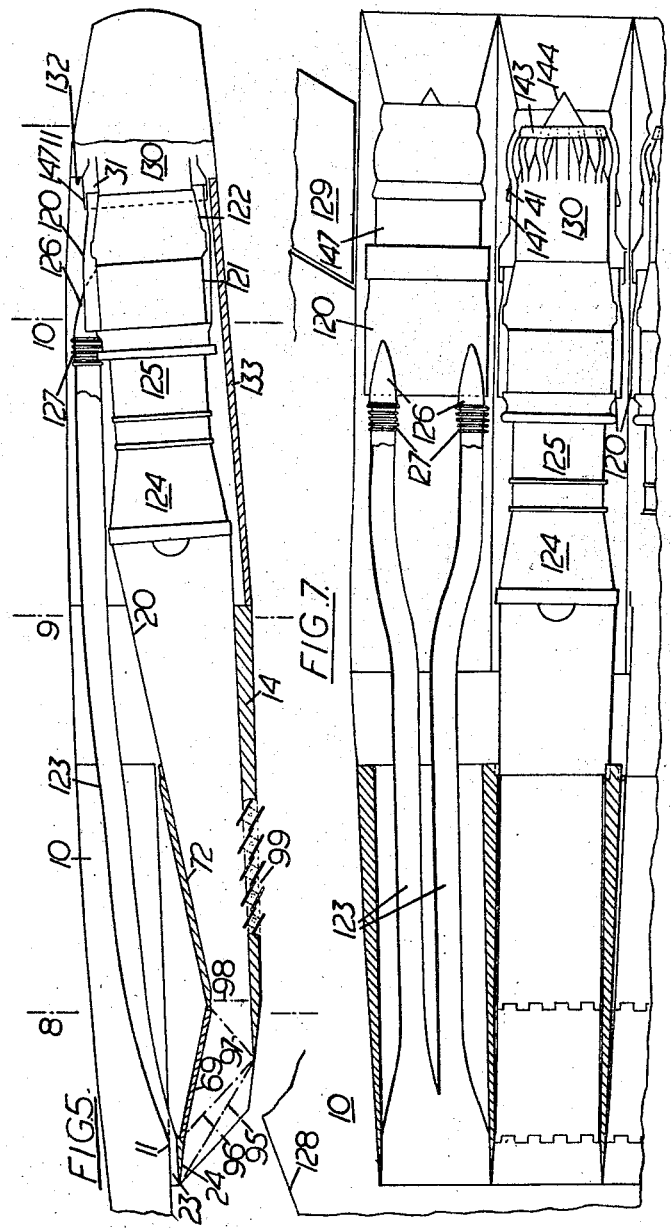

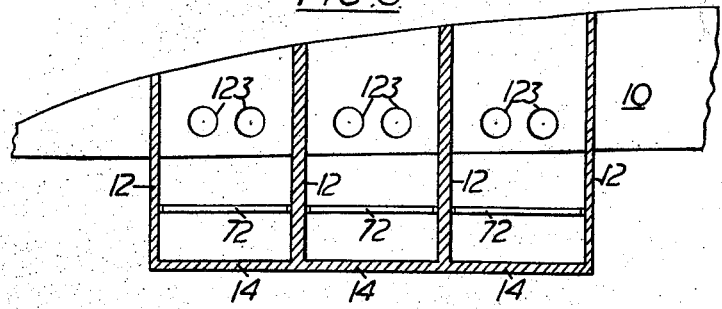
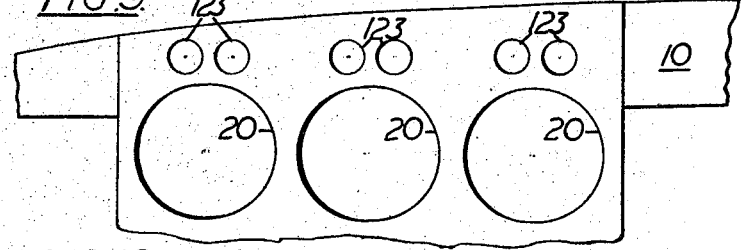
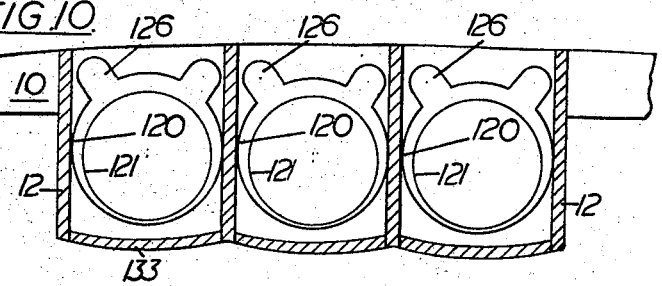
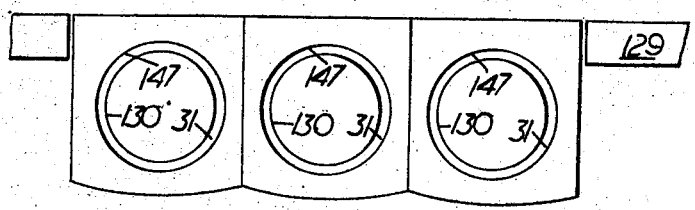

3,186,661
AIRCRAFT PROPULSION POWER PLANTS
Ralph Murch Denning, William James Lewis, Terence Edward Gouvenôt Gardiner, Peter Michael Runacres, and Philip William Davis, all of Bristol, England, assignors to Bristol Siddeley Engines Limited, Bristol, England, a British company
Filed May 8, 1961, Ser. No. 108,594
Claims priority, application Great Britain, May 13, 1960, 17,035/60
5 Claims. (Cl. 244—53)

This invention relates to a power plant for the propulsion of aircraft at supersonic speeds, the power plant being of the kind having an engine air intake opening spaced away from the surface of a part of the airframe, for example an aerofoil surface or a body surface, by an opening for the intake of boundary layer air so that the air entering the engine air intake arrives with the full free stream relative velocity. Although a convenient arrangement is for the boundary layer intake to have the same width as the engine air intake, this is not necessary. For example the boundary layer intake may be divided up by struts connecting the engine to the rest of the aircraft.

The power plant according to the invention comprises an airflow energising device, for example a turbojet engine, turbofan engine, combustor, heat exchanger or the like, hereinafter referred to generically as an engine, an engine intake duct extending to the inlet of the engine from a forwardly facing engine air intake opening, a jet pipe extending from the outlet of the engine to a rearwardly facing discharge opening, a boundary layer air duct extending from an intake opening, separated from the engine air intake opening by a wall having a sharp leading edge and having an opposite wall extending a substantial distance forwardly of the sharp leading edge so as to generate a boundary layer, to an outlet opening having a common boundary with, and discharging in substantially the same direction as, the discharge opening of the jet pipe, and a nozzle, adjustable in respect of outlet plane area, through which both the engine efflux and the air discharged from the boundary layer air duct pass into the atmosphere.

Preferably the boundary layer air duct is arranged so that, in a condition of the power plant appropriate for use at supersonic flight speeds, its cross sectional area is nowhere less than at its intake opening, and includes a divergent subsonic diffuser portion.

According to a feature of the invention, a power plant as defined in the last preceding paragraph, for mounting below an aircraft wing, comprises a substantially flat-topped forward section containing the engine air and boundary layer air intake ducts and the engine, a rear section containing the jet pipe discharge opening, the boundary layer air duct outlet opening and the mechanically adjustable nozzle, this section being arranged with the centre line of discharge through these elements lying approximately along the top of the forward section, and an interconnecting intermediate section containing the jet pipe.

According to a feature of the invention two opposite side walls of an inlet end portion of an engine air intake duct in a power plant of the kind mentioned in the first paragraph are continuous with the side walls of a superimposed portion of the boundary layer air duct, the two ducts being separated by a wedge structure comprising a substantially flat base wall connected at its leading and trailing edges to two ramps hinged together to form an apex, the base wall constituting a wall of the boundary layer duct, the leading ramp constituting an external compression surface of air entering the engine air intake duct and the trailing ramp constituting a wall of a diffuser portion of the engine intake duct, and actuating means are provided for moving the two ramps to vary the distance of the apex from the opposite side of the engine air intake duct.

The invention also includes a power plant as defined in the last preceding paragraph in which the compression ramp extends forward of the leading edge of the base wall to pivotal bearings carried by the side walls, so that on the ramps being moved by the actuating means the leading edge of the base wall is also moved, and in which the actuating means has one or more operative connections with the base wall to provide support therefor intermediate its ends.

A further feature of the invention consists in that an adjustable discharge nozzle, for an aircraft power plant of a kind which delivers a flow of jet gas and also a secondary flow of gas around the jet gas, includes means movable into a position obstructing rearward outflow of the jet gas, means movable into a position providing in an outer wall of the power plant, downstream of the outlet opening of a duct for the secondary flow, at least one opening for lateral outflow of the jet gas, and means, adjacent to the outlet opening of the secondary flow duct, movable into a position closing the secondary flow duct.

The invention is illustrated by examples shown in the accompanying drawings in which:

FIGURES 1A and 1B together form a section through a power plant taken in longitudinal-vertical plane;

FIGURE 5 is a longitudinal vertical section through a second constructional example also comprising three similar units arranged side by side but the aftermost part is shown only in outline, FIGURE 6 being a larger scale drawing of this part;

FIGURE 7 is a longitudinal-horizontal section corresponding to FIGURE 5 in which only two of the three units are fully shown, one of these being sectioned at a plane near the top of the unit so as to show the arrangement of the boundary layer ducting and the other being sectioned through the engine air duct;

FIGURES 8 to 11 are transverse sections at the planes marked 8 to 11 on FIGURE 5.

Figure 1:
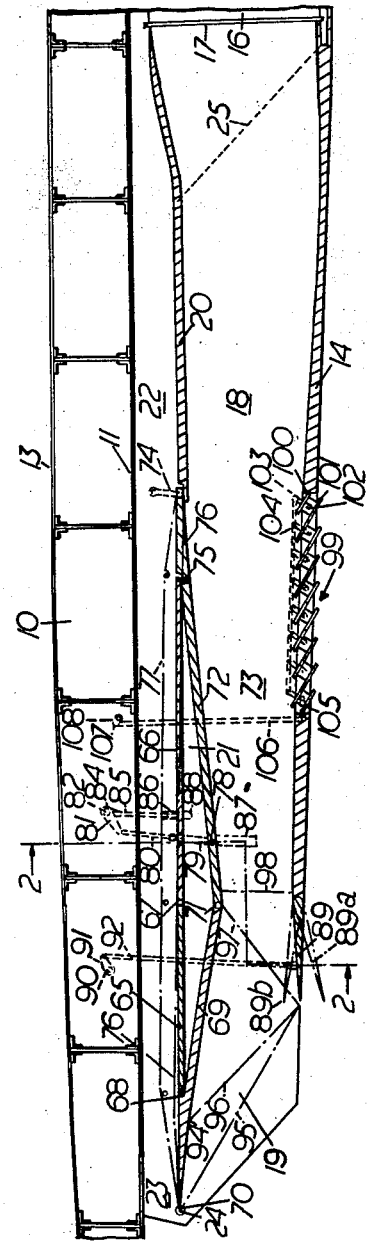
Figure 2:
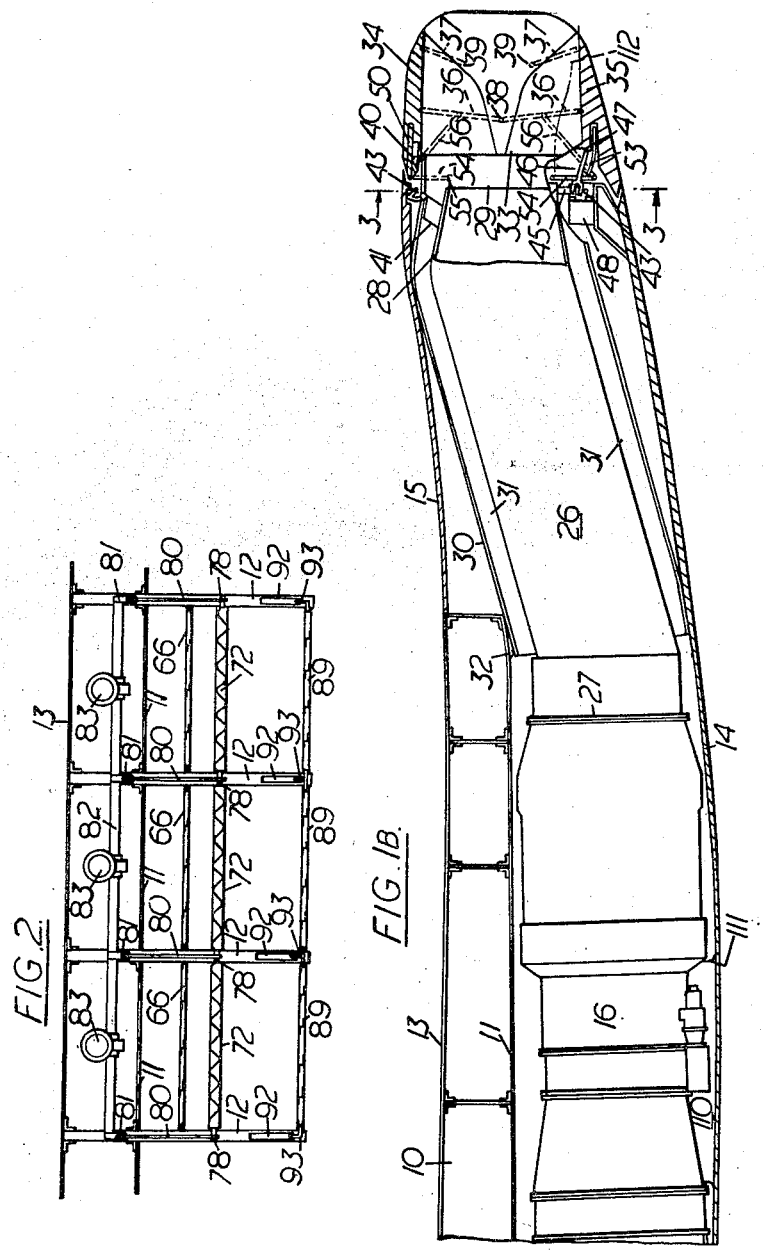
FIGURE 2 is a cross section towards the air intake end of the power plant take at the line 2—2 in FIGURE 1A.
Figure 3:
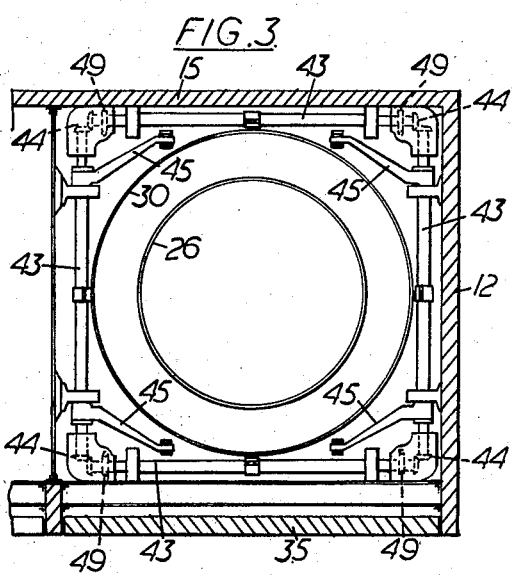
FIGURE 3 is a cross section towards the outlet end of the power plant taken at the line 3—3 in FIGURE 1B.

The constructional example shown in FIGURES 1 to 4 of the drawings is a multiple power plant composed of three similar units mounted side-by-side below wing structure 10 forming part of the airframe of an aircraft intended for flight at supersonic speeds. The units may however be used singly, or more than three may be arranged side-by-side. Each unit is approximately square in cross section, comprising a flat topped forward section bounded at the top by the lower skin 11 of the wing structure, at the sides by vertical walls 12 which extend through the wing structure to its upper skin 13 and at the bottom by a lower wall 14. Rear and intermediate sections of each unit are bounded at the top by an upper wall 15 which is an extension of the upper skin 13 of the wing structure and at the bottom by an upswept portion of the lower wall 14. The walls 12, 14 and 15 are in general of double skin "honeycomb" construction to provide the necessary strength and stiffness without undue weight.

Each unit comprises a turbojet engine 16 mounted in a central part of the space enclosed by the four walls 11, 12, 14 and 15 so that it is spaced from each wall to allow air to flow lengthwise over its exterior surface. From the inlet 17 of the engine an engine air intake duct 18 extends to an engine air intake opening 19 at the front end of the unit. This duct is bounded at its sides and bottom by the walls 12 and 14 and at its top partly by a partition 20 and partly by an adjustable wedge structure 21 which will presently be more fully described. The space between the lower skin 11 of the wing structure and the partition 20 and wedge structure 21 constitutes a boundary layer air duct 22 extending forwardly to an intake opening 23 which is separated from the engine air intake opening 19 by the straight leading edge 24 of the wedge structure. As indicated by the broken line 25, the boundary layer air duct 22 connects at its rear end with the space surrounding the engine 16 so that the boundary layer air flows over the exterior of the engine. On the underside of the engine a space 110 of approximately rectangular shape in plan view containing fuel system equipment is however divided off by partitions 111 so that any fuel leaking from such equipment may be drained away and does not mix with the boundary layer air.

A jet pipe 26 extends from the outlet 27 of the engine to a convergent nozzle 28 having a circular discharge opening 29. A coaxial pipe 30 of larger diameter surrounds the jet pipe 26 and forms with it an annular passage 31 for the boundary layer air, suitable sealing means 32 being provided at the point of junction with the square section passage containing the engine. The pipe 30 terminates, at a position somewhat to the rear of the jet pipe opening 29, in a circular opening 33; the effective outlet opening of the boundary layer air passage 31 is however an annulus surrounding the opening 29 of the jet pipe, so that the boundary layer air discharges in substantially the same direction as the engine efflux from the jet pipe. The upper and lower walls 15 and 14 terminate approximately in the plane of the jet pipe opening 29 and are continued as adjustable nozzle members 34 and 35. These members define a nozzle passage changing from circular to rectangular, so that when they are in the fully open position shown in FIGURE 1B the passage is divergent in respect of its cross section areas. Both the engine efflux from the jet pipe opening 29 and the boundary layer air from the annular passage 31 pass through this nozzle into the atmosphere. This rear section of the plant is raised with respect to the forward section containing the air intakes and the engine so that the centre line of the jet discharge lies approximately along the top of the forward section. The engine efflux will initially be moving at a higher velocity than the surrounding boundary layer air, but by viscous drag and some mixing at their common surface, the engine efflux will accelerate the boundary layer air so that the cross section of the boundary layer flow diminishes while that of the engine efflux increases. The effect is therefore that of a divergent section of nozzle for the engine efflux and a convergent nozzle for the boundary layer air, as indicated by the chain dotted line 112. The boundary layer air also protects the nozzle members from the hot efflux gases. In principle it is not essential for the outlet opening of the boundary layer air passage 31 to surround the opening 29 of the jet pipe completely, but they should have a common boundary over a substantial portion of the periphery of the jet pipe opening. Naturally it is desirable that the arrangement should be symmetrical to avoid undesired deflection of the jet and that the boundary layer air should flow over those parts of the nozzle requiring protection from the hot jet gases.

Figure 4:
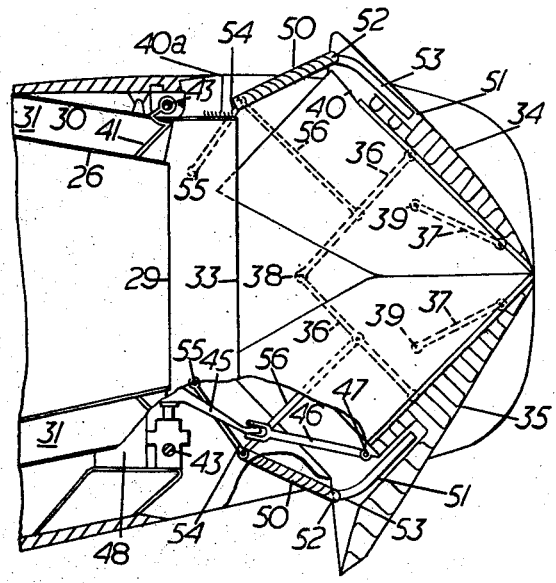
FIGURE 4 is a longitudinal-vertical section through the adjustable nozzle shown in FIGURE 1B but to a larger scale and with the nozzle in a different state of adjustment.

The nozzle members 34, 35 are each supported in the manner of a quadrilateral mechanism by two unequal links 36 and 37 pivoted at 38 and 39 respectively. The effect of this linkage is to constrain the members to move so that for an initial part of their travel an upstream part 40 overlapping the end of the pipe 30 moves approximately about a centre near the plane of the opening 33. The part 40 is curved about the said centre and co-operates with labyrinth seal members 40a on the outside of the pipe 30 so that, until the movement of the nozzle member is sufficient to carry the part 40 beyond the end of the pipe 30, the effect is to reduce the divergence of the nozzle without opening up a lateral escape path for the boundary layer air and engine efflux gases. In the case of a power plant required to produce reverse thrust it is arranged that further movement of the nozzle members then opens up such lateral paths at the top and bottom of the nozzle, and the members finally abut at their downstream ends as shown in FIGURE 4 and thus obstruct the normal axial outlet path for the air and gases, causing the gases to leave by the lateral openings. Since such obstruction would normally cause an increase of pressure sufficient to reverse the flow in the boundary layer air duct 31, which would be objectionable owing to the high temperature of the engine efflux gases, four flap valves 41 are provided for closing the annular air duct 31 as the nozzle members 34 and 35 move into their closed position. These flaps, which normally lie against the wall of the pipe 30 as shown in FIGURE 1B, are carried on four actuating shafts 43 (see FIGURE 3) which are interconnected at their ends by bevel gears 44 to form a square around the pipe 30. The two vertical shafts 43 also each carry two levers 45 connected by links 46 to anchorage pivots 47 on the nozzle members 34 and 35 for the purpose of moving these members. The safts are rotated by two or more actuating motors 48 through worm and formwheel drives 49. To provide a better braking effect, the gases issuing through the lateral openings are deflected forwardly by two cascades of deflector vanes 50. When the nozzle is in its open position, as shown in FIGURE 1B, the cascades 50 are housed in recesses 51 in the nozzle members 34 and 35. The rear end of each cascade is supported at each side by a roller 52 engaging a curved guide track 53, while the forward end is hinged to a link 54 pivoted to the fixed structure at 55 and to a link 56 hinged to the link 36 at an intermediate position along its length. This mechanism causes the cascades to be drawn out of the recesses 51 as the nozzle members close together and to take up the final positions shown in FIGURE 4. In the case of a multiple unit power plant the reverse thrust facility may be provided only in one or more of the units. For example, with three units as shown, only the two outboard engines (with reference to the aircraft centre line) may be provided with reversing nozzles.

The actuating motors 48 of the adjustable nozzle are preferably controlled in normal flight in dependence upon flight Mach number. Reverse thrust is initiated by the pilot operating a master switch and pulling back the throttle levers of the engines provided with reversing nozzles past the idling position. This action results in the engine speed being reduced to flight idling speed if the aircraft has not yet touched down on the runway. When the aircraft touches down, with the throttle in the thrust reversal position, a switch operated by compression of the landing gear signals the reverse thrust datum position to the nozzle control system. The nozzle members 34 and 35 are then brought to this datum position by the motors 48 which operate until the nozzle is closed and the cascades 50 are exposed. Closing of the nozzle actuates a switch which signals maximum engine speed to the engine control system so that maximum reverse thrust is developed. Subsequent forward movement of the throttle lever returns control of the nozzle to the normal flight control system.

Reverting to the forward end of the power plant, the wedge structure 21 of each unit comprises a substantially flat base wall consisting of two parts 65 and 66 connected by a hinge 67 to provide a small degree of flexibility. At its leading edge the base wall is connected by a hinge 68 to a ramp 69 the under surface of which constitutes an external compression surface for the engine air. The ramp 69 extends forwardly of the hinge 68 to its leading edge 24, where it is supported by pivotal bearings 70 carried by the side walls 12. At its downstream end the ram 69 is connected by a hinge 71 to a ramp 72 constituting a wall of a diffuser portion 73 of the engine air intake duct. The downstream end of the diffuser ramp 72 is supported by a pair of links 74, situated in a hollow part of the side walls 12, in approximately sliding sealing relation with the upstream end of the partition 20. The downstream end of the part 66 of the base wall is connected to the ramp 72, at a position somewhat upstream of the links 74, by links 75 allowing sufficient endwise movement to permit the ramps 69 and 72 to be raised from the position shown in full lines in FIGURE 1A to a position indicated by a chain dotted line 76, this line representing the under surface of the ramps 69 and 72. Simultaneously, the base wall parts 65 and 66 move upwardly until their upper surfaces reach the position shown by the chain dotted line 77. When the ramps 69 and 72 are in their lowermost position they form an apex at the hinge 71 and the movements of the ramps effectively vary the distance of the apex from the opposite side of the engine air intake duct. This adjustment is used to adapt the engine air intake for different speeds, the ramps 69 and 72 being in their lowermost position at the normal cruising speed of the aircraft. At this speed the part 65 of the base wall and the upper surface of the leading edge part of the ramp 69 are in alignment with one another and parallel to the lower skin 11 of the wing structure so that the cross sectional area of this part of the boundary layer air duct is constant and equal to approximately a third of the capture area of the engine air intake i.e. the projected area between the leading edge 24 of the wedge structure and the leading edge of the lower wall 14. The part 66 of the base wall however diverges from the lower skin 11, so that by the time the beginning of the passage 22 is reached the cross sectional area has increased to about one and a half times its original value. Thereafter the cross sectional area of the boundary layer air duct remains substantially constant to its outlet in the plane of the opening 29 of the jet pipe. To effect the required movements, the ramps 72 are provided with a pair of spigot pins 78 projecting into hollow spaces in the side walls 12 through slots 79 and there connected by links 80 to crank arms 81 on an actuator shaft 82 extending through the wing structure 10. The actuator shaft, which is preferably common to the three units, is driven by three actuating motors 83 and also carries, in each wall 12, a shorter crank arm 84 connected by a link 85 to a spigot pin projecting from the base wall part 66 through a slot 86. The links 85 accordingly provide support for the base wall intermediately of its ends, the length of the crank arms 84 and their phasing relatively to the crank arms 81 being chosen so that the two parts of the base wall remain substantially in alignment with one another, variations in cross section of the boundary layer air duct 22, such as would cause undesirable pressure losses, being thus kept to a minimum. The three motors 83 each drive the shaft 82 through a break neck connection so that although they are irreversible themselves, a failed motor will not prevent the shaft being driven by the other motors. The slots 79 and 86 in the side walls 12 are covered by plates 87 and 88 attached to the link connection pins to prevent entry of air and dust from the engine air duct when the ramps are moved to their raised positions. Suitable boundary layer bleed openings provided in the flank wall 72 immediately behind the hinge 71 allow a counterbalancing pressure to build up in the interior of the wedge structure 21, this interior being vented to the boundary layer air passage 22 through openings provided in the base wall member 66 near its rear end.

A leading edge portion 89 of the lower wall is hinged to the remainder to form a variable incidence cowl lip capable of being moved upwardly or downwardly from the normal cruising speed position shown in full lines in FIGURE 1A, in which its under surface is in alignment with the under surface of the lower wall 14. These movements are effected by three motors (not shown but similar to the motors 83) operating a shaft 90 carrying, in a hollow space in each side wall 12, a crank arm 91 connected by a link 92 to a lever 93 carried by the hinged lip 89.

The compression surface of the ramp 69 has an inflexion at 94 and the configuration is such that at the cruising speed, when the parts are in the positions shown in full lines in FIGURE 1A, oblique shock waves indicated by chain dotted lines 95 and 96 extend from the leading edge 24 and the inflexion 94 to the region of the leading edge of the lip 89. A further oblique shock wave also extends from the leading edge of the lip 89 to the apex of the wedge structure at the hinge 71 as indicated by a chain dotted line 97.

The power plant is preferably operated during cruise in a slightly super critical condition, that is to say with the normal shock wave, indicating transition from supersonic air flow speed to subsonic speed, slightly downstream of the apex of the wedge structure, as indicated by a chain dotted line 98. To allow this condition to be maintained, a valve system 99 for blowing off excess air from the diffuser 73 is provided in the lower wall 14. This valve system is also designed to facilitate entry of air into the diffuser under take-off conditions and comprises a number of similar valve members each comprising a top portion 100, a bottom portion 101 and interconnecting web portions 102, the members being pivoted for movement about an axis passing through the web portions and having, within hollow parts of the side walls 12, actuating levers 103 connected by a coupling rod 104. The foremost valve member also has a pair of actuating levers 105 connected by links 106 to crank arms 107 on an actuator shaft 108 driven by suitable actuating motors, not shown but similar to the motors 83. In one position of adjustment all the top portions 100 and all the bottom portions 101 are in alignment and form continuations of the top and bottom surfaces of the wall 14 so that the opening in the latter in which the valve members are mounted is completely closed. From this position the valve members are rotatable either clockwise or anticlockwise to bring the top portion or the bottom portion, or both in the case of intermediate members, into alignment with the bottom or top portion respectively of the next adjacent member. As shown in FIGURE 1A, the clockwise rotation opens up oblique passages facilitating blowing off air from the diffuser 73 for the purpose of controlling the position of the normal shock wave 98. During this phase of operation the valve system is normally partly open and the actuating motors are controlled by devices sensing the pressure difference across the normal shock wave, so that when the shock wave tends to move upstream from the desired position the valve system is opened further to reduce the pressure in the diffuser and return the normal shock wave to the desired position. Conversely, if the normal shock wave tends to move downstream the valve system is closed further to increase the pressure in the diffuser. A separate shock wave sensing and valve actuating system is provided for each unit of the multi-unit power plant so that should it become necessary to stop the engine of one of the units the valve system of that unit will open sufficiently to prevent the normal shock wave being forced out of the intake, which, if it were allowed to occur, would involve a heavy drag penalty and cause an unstable flow condition known as "buzz," producing fluctuating loads likely to result in severe damage to the intake and possible structural failure.

During ground running and the initial part of the take-off run the members of the valve system 99 are rotated anticlockwise so that the system is open for entry of air, the ramps 69 and 72 are in their fully raised positions indicated by the chain dotted lines 76 and 77, and the hinged lip 89 is turned downwardly into a fully lowered position 89a, also indicated by chain dotted lines. The actuating motors are controlled by a Machmeter so that the lip rises to the full line position 89 as take-off speed is approached, and remains in that position for subsonic flight. As flying speed increases through the trans-sonic range the hinged lip is turned upwardly to a fully raised position 89b and the wedge structure is partly lowered. The valve system 99 closes as soon as the pressure in the engine air duct 18 rises above atmospheric. Still further increase in speed is accompanied by lowering of the hinged lip 89 and of the wedge structure 21, the positions shown in full lines in FIGURE 1A being reached upon attainment of the normal cruising speed. To enable the required motion of the hinged lip 89 to be conveniently produced, the crank 91 is arranged to pass through its upper dead centre position in relation to the link 92 when the lip is in its uppermost position. This enables the actuator shaft 90 to be rotated progressively in the same direction through the speed range.

Provision may be made for lowering the cowl lips 89 independently of one another during flight at supersonic speeds, so that if for any reason the normal shock wave 98 of one of the intakes were expelled, in spite of the bleed valves 99 opening, the cowl lip of that intake could be lowered to cause return of the shock wave.

The constructional example shown in FIGURES 5 to 11 differs from the first example principally in the following respects. Firstly the boundary layer air collected by the intake openings 23 between the underside 11 of the wing 10 and the leading edge 24 of the intake ramp system is carried to a casing 120 surrounding the combustion section 121 and the turbine section 122 of the engine by one or more separate ducts 123 passing through the wing structure. The flat base wall parts 65 and 66 of the ramp structure of the first embodiment are thus eliminated, and the boundary layer air does not flow over the exterior of the compressor sections 124, 125 of the engines. As may best be seen from FIGURE 10, the casings 120 are eccentrically disposed with respect to the engines at their forward ends, being displaced upwardly so that the intervening space is increased in the neighbourhood of the entry connections 126 for the boundary layer air. In this way changes of section in the boundary layer system are reduced. Flexible sections 127 are provided between the ducts 123 and the casings 120, and at their rear ends the latter slide in a casing 147 forming the outer wall of the rearmost part of the boundary layer air duct 31. The wing 10 has a sharply swept leading edge 128 and is provided with ailerons 129 along its trailing edge immediately outboard of the power plant, the latter projecting somewhat beyond the ailerons.

A second principal difference is that the power plant is shortened and lightened by moving the jet nozzle structures close up to the engines, but leaving space for short re-heat combustion sections 130. As may be seen from FIGURE 6 each re-heat section 130 is combined with its corresponding primary nozzle structure and is separable from the corresponding engine proper at a plane 131 which lies forward of a structural diaphragm 132 so that the engine can be removed after opening access doors 133 in the bottom wall 14 of the unit. The re-heat section includes a tubular central extension 134 of the turbine exhaust cone 135 which is supported from the outer casing 120 by a number of hollow aerofoil section arms 136. The arms 136 also have links 137 attached to their downstream edges the other ends of which support a concentric series of flame holding gutters 138. The arms 136 also support, upstream of each gutter 138, a circular fuel manifold 139 and a carburetion gutter 140 into which jets of fuel from the fuel manifold impinge in an upstream direction and are dispersed laterally and circumferentially, the dispersed fuel being carried downstream by the turbine exhaust gases and burning in the wake of the gutters 138. A perforated screech damper 141 is provided around the zone of combustion. Fuel is supplied to the manifolds 139 by pipes 142 passing through the arms 136.

A third principal difference is that the plain convergent primary nozzles 29 of the first constructional example are replaced by fluted nozzles 143 having an axially movable centre body 144 for area adjustment, the fluting resulting in a reduction in the jet noise. The centre body 144 of each nozzle is adjustable by an air turbine servo motor 145 which is arranged in the forward, and therefore coolest, end of the tubular central extension 134 and is supplied with motive air by a pipe 146 passing through one of the arms 136. In consequence of the fluting, the flap valves 41 for preventing reverse flow along the boundary layer passage 31 are moved forwards to a position ahead of the fluting.

The second example also differs from the first in respect of the mechanism used to move the secondary nozzle adjustable members 34 and 35. As may be seen from FIGURE 6, pivot pins 185, 186 on the members 34 and 35 of each nozzle are respectively linked to a pair of fixed pivots 148 arranged one on each side of the nozzle by pairs of links 149 and 150, the axis of the pivots 148 passing through the centre of curvature of a spherically curved end portion 151 of the casing 147 which has a minimum working clearance from correspondingly shaped surface parts 152 on the members 34 and 35 when the latter are within a first range of adjustment from their fully open positions. The members 34 and 35 are also each provided with a pair of pivots 153, 154 which on the one hand slide in cam grooves 155, 156 carried by the fixed side walls of the unit and on the other hand are connected by links 157, 158 respectively to pivots 166 on a pair of upper bellcrank levers 159 and pivots 167 on a pair of lower bellcrank levers 160. The lower bellcrank levers are interconnected by a common pivot shaft 161 and are swung by a screw jack 162 driven by an air motor 163. The air motor may be duplicated for each power unit, or alternatively, if the nozzles are to be adjustable solely in response to flight Mach number, the shafts of the three adjacent units may interconnected. The upper bellcrank levers 159 are swung about pivots 164 by a pair of links 165 connected to the lower bellcrank levers. The pivots 166 and 167 are also arranged to slide along cam tracks 168, 169 in bellcrank levers 170, 171 which are mounted on fixed pivots 172, 173 and have arms 174, 175 connected by links 176, 177 to a ring 178 which carries a crosshead slide 179 for each of the flap valves 41, a slider 180 in each slide being pivoted to an arm 181 on its corresponding flap valve.

The system is shown with the nozzle members 34 and 35 in their fully open positions and operates in the closing direction as follows. Operation of the air motor 163 to extend the jack 162 causes the lower bellcranks 160 to turn clockwise and the upper bellcranks 159 to turn anticlockwise, the pivots 153, 154 on the nozzle members being moved rearwardly. For a first part of this movement the pivots 153, 154 follow portions of the fixed cam tracks 155, 156 which are circular arcs about the axis of the pivots 148. The nozzle members 34 and 35 and the links 149, 150 accordingly swing around this axis to the pin positions 185a, 186a in which the edges 182 of the nozzle members butt together on the horizontal central plane of the nozzle, the outlet passage becoming convergent and the minimum working clearance being maintained between the end 151 of the boundary layer air casing and the surfaces 152 of the nozzle members. During this motion the pivots 166, 167 move along portions of the cam tracks 168, 169 which are circular arcs about the pivots 164 and 161 respectively of the bellcrank levers so that no movement is imparted to the ring 178 and the flap valves 41 remain open. To move the nozzle members into thrust reversal position the jack 162 is further extended so that the pivots 153, 154 move into portions 183, 184 of the cam tracks 155, 156, the nozzle members 34 and 35 being thereby rotated around the pivots at 185a and 186a until their trailing edges butt together on the horizontal central plane of the nozzle. This position of the lower nozzle member 35 is shown in chain-dot lines 35a. Simultaneously the pivots 166, 167 move into straight parts 187, 188 of the cam tracks 168, 169 causing the ring 178 to be moved rearwardly and the flap valves 41 to be closed across the boundary layer passage 31. Also, flow deflecting cascades 189 which are housed partly in the nozzle members 34, 35 and partly in the upper and lower walls of the lower unit when the nozzle is open, are drawn out, as indicated in chain-dot lines at 189a, into the gap which opens up between the nozzle members 34, 35 and the rear end 151 of the boundary layer air casing 147. The rear end of each cascade is hinged directly to the adjacent nozzle member, while the front end has trunnions 190 which move along cam tracks 191 carried by the side wall structure. As in the case of the first constructional example, the reverse thrust facility may be provided in one only of the three power units on each side of the vertical centre plane of the aircraft, preferably the outboard units. In this case the bellcrank pivot shafts of the inboard units might be interconnected and driven by two jacks 162 of appropriate travel, while the outboard units would have separate pivot shafts driven by duplicated longer travel jacks.

We claim:
1. An aircraft power plant comprising an engine having an inlet and an outlet, means defining a forwardly facing first air intake opening, a duct extending to the inlet of the engine from the first air intake opening, a primary nozzle defining a rearwardly facing jet discharge opening having a fixed outer periphery, a jet pipe extending from the outlet of the engine to the primary nozzle, said jet pipe enclosing jet gas discharged from the outlet of the engine, a secondary nozzle having an inlet end adjacent to but substantially larger in area than the discharge opening of the primary nozzle and a rearwardly facing jet discharge opening, said discharge opening being spaced rearwardly from the jet discharge opening of the primary nozzle, means defining a second air intake opening including a wall having a sharp leading edge and adapted to separate the second air intake opening from the first air intake opening and an opposite wall extending a substantial distance forwardly of the sharp leading edge so as to generate a boundary layer which enters the second air intake opening, a boundary layer air duct defined by inner and outer walls and extending from the second air intake opening to an outlet end substantially coaxial with and of the same external form as the inlet end of the secondary nozzle, and closure means adjacent to the outlet end of the boundary layer air duct movable into a position closing said boundary layer air duct, the secondary nozzle being constituted by structure comprising a pair of U-section nozzle members having upstream and downstream ends, and supporting means for the members, permitting movement of the members through a first range in which they define a continuation of the outer wall of the outlet end of the boundary layer air duct, which continuation is variable between divergence and convergence, and a second range in which the upstream ends of the nozzle members move outwardly from the outlet end of the outer wall of the boundary layer air duct to provide openings for lateral outflow of the jet gas discharged from the jet discharge opening of the primary nozzle, while the downstream ends of the nozzle members move inwardly and finally butt together at the end of the second range.

2. An aircraft power plant according to claim 1, in which the primary nozzle is a convergent nozzle with a fluted outer periphery.

3. An aircraft power plant according to claim 2, in which the primary nozzle includes an axially movable centre body.

4. An aircraft having a wing, and a power plant according to claim 1 mounted beneath the wing rearwardly of its leading edge, the opposite wall of the second air intake opening being constituted by the lower surface of the wing so that the second air intake opening takes in part of the boundary layer flow over the underside of the wing.

5. A power plant according to claim 1, in which the engine is a turbojet engine comprising in axial sequence compressor, combustor, turbine and jet pipe sections each with an external airtight casing, and in which the boundary layer air duct includes an annular section the inner wall of which is constituted by the combustor, turbine and jet pipe casings.

References Cited by the Examiner
UNITED STATES PATENTS

| | | |
|---|---|---|
| 2,597,253 | 5/52 | Melchoir. |
| 2,639,578 | 5/53 | Pouchot _____ 60—35.6 |
| 2,841,955 | 7/58 | McLafferty _____ 60—35.54 |
| 2,971,331 | 2/61 | Silverman et al. _____ 60—35.6 |
| 2,973,621 | 3/61 | Price _____ 60—35.6 |
| 2,987,883 | 6/61 | Fawler. |
| 2,995,892 | 8/61 | Kosson et al. _____ 60—35.6 |
| 2,997,845 | 8/61 | Oulianoff _____ 60—35.54 |
| 3,020,713 | 2/62 | Bertin et al. _____ 60—35.54 XR |
| 3,028,730 | 4/62 | Clark _____ 60—35.55 XR |
| 3,098,352 | 7/63 | Taub et al. _____ 60—35.6 |
| 3,113,428 | 12/63 | Colley et al. _____ 60—35.6 XR |

FOREIGN PATENTS

| | | |
|---|---|---|
| 1,234,483 | 5/60 | France. |
| 817,508 | 7/59 | Great Britain. |
| 865,507 | 12/60 | Great Britain. |

SAMUEL LEVINE, *Primary Examiner.*
ABRAM BLUM, *Examiner.*